(12) United States Patent
Caldas

(10) Patent No.: US 10,660,502 B2
(45) Date of Patent: May 26, 2020

(54) CONTAINER FOR CLEANING AND MESSY PRODUCTS

(71) Applicant: Pull-Liner Innovations, Paris (FR)

(72) Inventor: Raphaël Caldas, Nanterre (FR)

(73) Assignee: PULL-LINER INNOVATIONS, Paris (FR)

( * ) Notice: Subject to any disclaimer, the term of this patent is extended or adjusted under 35 U.S.C. 154(b) by 641 days.

(21) Appl. No.: 15/126,583

(22) PCT Filed: Mar. 17, 2014

(86) PCT No.: PCT/FR2014/000056
§ 371 (c)(1),
(2) Date: Nov. 15, 2016

(87) PCT Pub. No.: WO2015/140416
PCT Pub. Date: Sep. 24, 2015

(65) Prior Publication Data
US 2017/0143187 A1    May 25, 2017

(51) Int. Cl.
*A47L 23/22* (2006.01)
*A47G 27/02* (2006.01)
(Continued)

(52) U.S. Cl.
CPC .............. *A47L 23/22* (2013.01); *A47G 27/02* (2013.01); *A47L 23/266* (2013.01); *A47L 23/28* (2013.01);
(Continued)

(58) Field of Classification Search
CPC .......... A47L 23/22; A47L 23/24; A47L 23/26; A47L 23/266; A47K 7/026; A47K 7/03;
(Continued)

(56) References Cited

U.S. PATENT DOCUMENTS 2,843,868 A * 7/1958 Borgstrom ............ A47L 23/266
15/215
4,107,811 A   8/1978 Imsande
(Continued)

FOREIGN PATENT DOCUMENTS

DE    28 01 636 AI    7/1979
DE    41 02 326 A1    7/1992
(Continued)

OTHER PUBLICATIONS

International Search Report for International Application No. PCT/FR2014/000056 dated Nov. 12, 2014 (3 pages).
(Continued)

*Primary Examiner* — Mark Spisich
(74) *Attorney, Agent, or Firm* — Alan F. Feeney; Feeney Law Group

(57) ABSTRACT

Improved container for messy products which is made up of a framework (17) covered by a superposition (14) of membranes (15a to 15d), each of which is equipped with means of assembly by adhesion of at least part of at least one of the contact faces thereof to the contiguous membrane or membranes allowing said membranes to be separated by a peeling effect, said means of assembly consisting of a multitude of mechanical catching protuberances (16). The improvements made to this container relate on the one hand to the nature of the materials used for making the various components of this container and, on the other hand, to novel methods for obtaining some of said components.

13 Claims, 3 Drawing Sheets

(51) Int. Cl.
*B32B 7/06* (2019.01)
*A47L 23/26* (2006.01)
*B32B 1/02* (2006.01)
*B32B 7/08* (2019.01)
*A47L 23/28* (2006.01)
*B32B 37/06* (2006.01)
*B32B 37/10* (2006.01)

(52) U.S. Cl.
CPC .................. *B32B 1/02* (2013.01); *B32B 7/06* (2013.01); *B32B 7/08* (2013.01); *B32B 37/06* (2013.01); *B32B 37/10* (2013.01); *B32B 2307/748* (2013.01); *B32B 2432/00* (2013.01); *B32B 2439/02* (2013.01)

(58) Field of Classification Search
CPC ....... A47G 27/02; A47G 27/0206; A61L 2/00; A61L 2/02; A61L 2/16; A61L 2/18; B32B 1/02; B32B 7/06; B32B 2432/00
USPC ......... 15/104.92, 104.93, 215–217, 223, 161
See application file for complete search history.

(56) References Cited

U.S. PATENT DOCUMENTS

| | | | | |
|---|---|---|---|---|
| 4,559,250 | A | | 12/1985 | Paige |
| 5,792,712 | A | * | 8/1998 | Hori ........................ A01N 25/34 15/104.93 |
| 2004/0148725 | A1 | * | 8/2004 | Blum ...................... A47L 23/22 15/215 |
| 2004/0261209 | A1 | * | 12/2004 | McKay .................. A47L 23/266 15/215 |
| 2010/0296970 | A1 | * | 11/2010 | Trimarco ............... A47K 3/022 422/37 |

FOREIGN PATENT DOCUMENTS

| | | | |
|---|---|---|---|
| DE | 299 11 216 U1 | | 11/1999 |
| EP | 1 601 581 A1 | | 12/2005 |
| FR | 2590473 | * | 5/1987 |
| FR | 2792820 | * | 11/2000 |
| GB | 1 340 636 A | | 12/1973 |
| GB | 2268399 | * | 1/1994 |
| JP | 5-7546 | * | 1/1993 |
| WO | 89/06982 | * | 8/1989 |

OTHER PUBLICATIONS

International Preliminary Report on Patentability for International Application No. PCT/FR2014/000056 dated Nov. 12, 2014 (6 pages) (English language Translation).

* cited by examiner

CONTAINER FOR CLEANING AND MESSY PRODUCTS

CROSS-REFERENCE TO RELATED APPLICATION

This application is the U.S. national phase of PCT Application No. PCT/FR2014/000056 filed on Mar. 17, 201.4, the disclosure of which is incorporated in its entirety by reference herein.

The present invention relates to European patent no. 1601581, which describes a container for messy products comprising self-cleaning means comprising of a framework covered with a layering of membranes, each of which is provided with means for being assembled through adherence of at least part of at least one of the contact faces to the adjacent membrane(s), enabling said membranes to be peeled off. These assembling means are composed of a multitude of mechanically engaging protuberances. The system described herein enables the cleaning of the container, after use, by peeling away the soiled membranes one by one. It is the object of the present invention to provide a series of improvements in the area of materials used and in the area of methods used to obtain the container from these materials.

These improvements relate more particularly to the method of joining together the membranes made with these materials and are aimed at improving the quality of the product and of its ease of use. The aim is to provide a container that is at once more compact and rigid during use and can be cleaned with greater ease through easier elimination of the soiled membranes by peeling them off.

The improvements concerning the methods of production have the aim of improving productivity and the flexibility of industrial organization by breaking down production into elementary operations, thus enabling the containers to be manufactured partially and successively in different production units, which enables existing industrial installations distributed throughout several countries to be optimally utilized. To this end, a semi-finished product is first produced in the form of an easy-to-store and easy-to-transport sheet that is then used as the raw material for the formation of the containers.

Moreover, the improvements involve the materials providing better adaptation to the methods of production, less ecological impact, and an expansion of the field of application of the concept of this container to new products derived as described in the following.

According to the invention, the primary improvement of the container for messy products, which comprises of a framework covered by a layering of peelable membranes joined together by means of a plurality of mechanically engaging protuberances, consists in alternating in said layering two types of membrane that cannot be hot-welded to one another. In addition, however, the present invention describes a range of choices for the material and treatment of the contact surfaces of the membranes, which constitute yet other improvements.

For instance, as the choice of materials to constitute the layering, the use of membranes made of polyethylene (PE), polyethylene terephthalate (PET), polyvinyl chloride (PVC), polypropylene (PP), or polystyrene (PS) is claimed. It is possible to alternate such membranes on a one-by-one basis with membranes of any other kind that are not hot-weldable to these materials, and it is also possible to alternate membranes made from two different plastic materials that cannot be welded to one another and, for example, two of the abovementioned plastic materials.

Moreover, to realize said layering, it is proposed that membranes be selected from those that exhibit, even if only on a microscopic scale, a natural roughness composed of protuberances that are capable of interlocking from one membrane to another in order to enable mechanical engagement therebetween. On the other hand, in order to achieve this characteristic, it may be necessary to perform specific treatments on the contact surfaces of these membranes, either by local deformation or by removal of material (sanding, scraping, blasting, etc.) or by adding material as described below. To do this, one of the improvements consists in imprinting on these membranes, either under heat or under pressure, a plurality of protuberances by passing each membrane or the set of membranes constituting the layering between pressure rollers having a relief pattern. Another improvement for obtaining this plurality of protuberances consists in creating an ink deposit on these contact surfaces using spraying or silk screen printing techniques. It is also possible to create roughness on the surface of the membranes by means of another improvement of the container, which consists in obtaining the plurality of mechanically engaging protuberances through flocking of fibers cast onto the plastic material when constituting the membranes. In this case, this flock of fibers can also be impregnated with fluids or powders having olfactory and/or disinfectant and/or bacteriostatic properties, whereby the peeling-away of each one of the membranes after being soiled not only provides a clean membrane on the surface but also releases the active substances contained in the fluids or powders, stored in the layering, which are then exposed to the ambient air. This plurality of mechanically engaging protuberances can also be obtained by casting powders composed of particles having an olfactory and/or disinfectant and/or bacteriostatic characteristic onto the plastic material of the membranes having been rendered adherent through softening under heat, whereby the peeling-away of each one of the membranes after being soiled not only provides a clean membrane on the surface but also releases the active substances contained in the powders, stored in the layers, which are then exposed to the ambient air.

The two devices described above which enable antimicrobial fluids or powders to be stored and released progressively find application in the realization of decontaminating mats for protecting accesses to hospitals, clinics, laboratories, food processing facilities and other areas that are sensitive to the intrusion of microbes as a result of the soiled soles of visitors' shoes. They simultaneously enable mats to be implemented that can be cleaned quickly after soiling by peeling away the membranes of which they are composed one by one and to also provide additional functions in these mats that are associated with the products they release for the purpose of protecting these locations which are sensitive to the intrusion of these microbes and unpleasant odors.

The present invention also proposes the implementation of another type of membrane in which the plurality of protuberances is obtained through the expansion of the plastic material constituting these membranes by introducing a blowing agent into this plastic material.

Another series of improvements concerns the implementation of the framework. It is thus proposed that the framework be made, depending on the specific requirements of the various applications of the invention, either of cardboard, of fibers that have been compressed and bound together with the aid of a binding agent, of expanded plastic material, or of a composite material that combines a plastic material with natural microfibers from agriculture.

The container according to the invention is also improved through the adoption of novel methods for obtaining this container and, first and foremost, through a novel manner of achieving mechanical engagement between the adjacent membranes constituting the layering. This novel method utilizes pressurized heating means which, in a first step, produce random interpenetration of the protuberances that cover the contact surfaces of these adjacent membranes, with formation of a network of interconnected pores. In a second step, under the combined effect of the pressure and of the softening of the material as a result of the heating, these interconnected pores gradually fill up, expelling any air bubbles and thus achieving continuous contact of the surfaces and interconnecting them without welding, since the materials used cannot be welded to one another. This method simultaneously enables the membranes to be compactly joined together and easily peeled away one by one. Such peeling would be very difficult or even impossible if the membranes were welded together. Numerous pressurized heating means suitable for use in performing this operation are known from the prior art. According to the invention, one in particular uses a heating tunnel in combination with at least one pair of counter-rotating pressure rollers for carrying along the layering of membranes inside this tunnel.

According to the invention, the container is also improved by two novel methods for obtaining the container that implement a process comprising two distinct phases. In the first phase, the mutually adherent membranes are superimposed thus producing a semi-finished product in the form of a sheet. In the second phase, the container is formed from the semi-finished product in the form of a sheet by means of thermoforming or thermocompression.

According to the invention, the product in the form of a sheet can be obtained particularly, but not exclusively, using two techniques. The first consists in simultaneously hot-extruding through parallel dies as many films of plastic material as there are membranes in the layering. These films then adhere to one another before cooling as they pass between the compression rollers. The second technique consists in simultaneously unwinding as many plastic films stored on spools as there are membranes in the layering and then entraining and passing these superposed films through a heating tunnel and between at least one pair of compression rollers.

The semi-finished product in the form of a sheet produced in this way, for example using these two techniques, is then divided into successive panels linked to one another by a series of flexible hinges formed by scoring, thus enabling them to be folded in the manner of an accordion to form reams for storage. The reams are then delivered on transport pallets to thermoforming workshops, where each panel can be stamped into one or more containers.

Other features and advantages of the invention will become apparent over the course of the following description, which is provided with reference to the enclosed drawings, in which.

Figure 1:
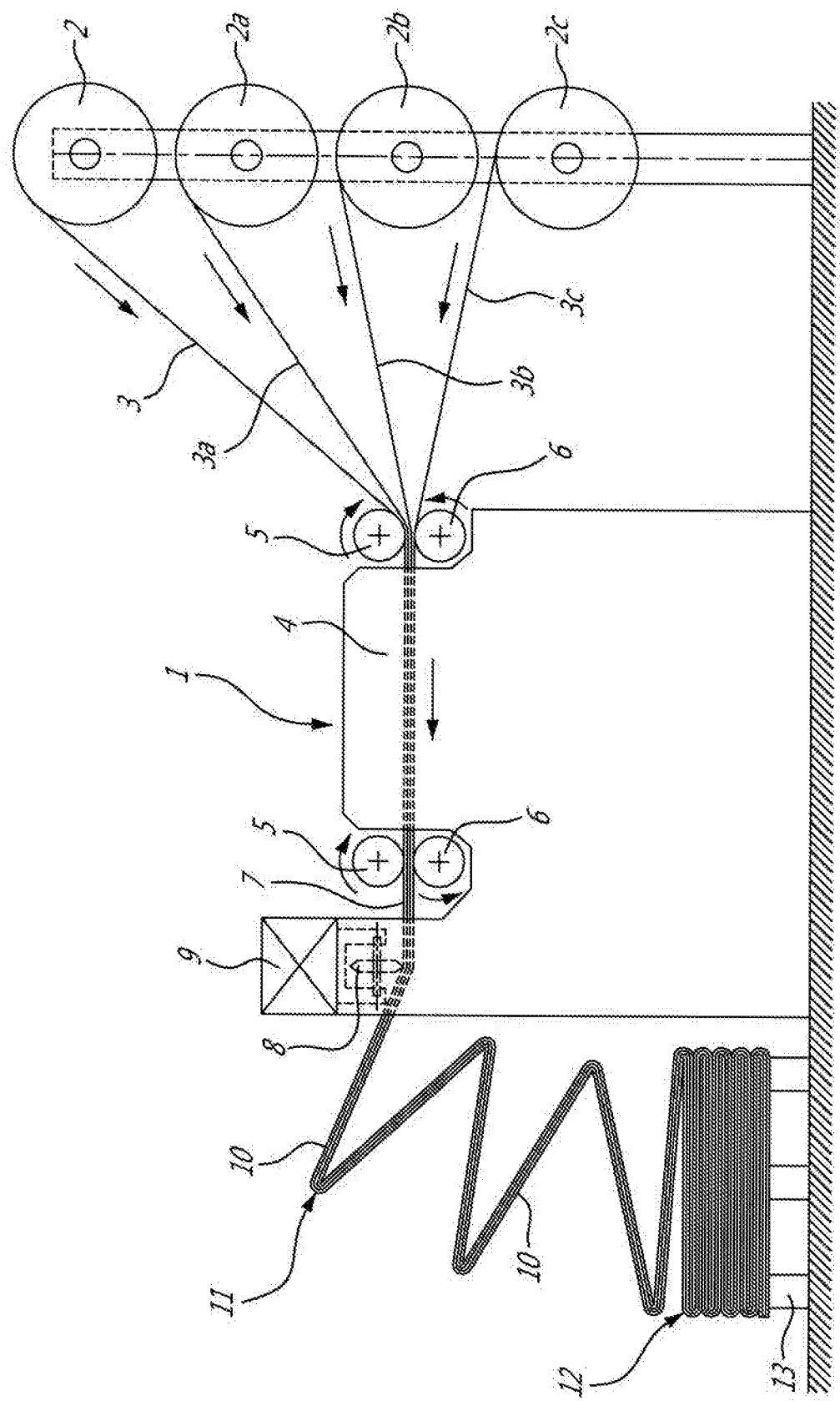
FIG. 1 is a schematic view in longitudinal section of a production facility for the semi-finished products in the form of sheets, illustrating a method for obtaining the container according to the invention.

FIG. 1 shows, by way of non-limiting example, a production facility (1) of the semi-finished products in the form of sheets. This facility is composed of a series of spools (2, 2*a*, 2*b*, 2*c*) for storing plastic films (3, 3*a*, 3*b*, 3*c*) that are divided simultaneously and delivered to a heating zone (4) by opposing pressure rollers (5) and (6) turning in opposite directions. Upon being discharged from this heating zone (4), the layering of plastic films (3 to 3*c*) constitutes a single sheet (7) that is still hot and is scored at regular intervals with the aid of a cutting wheel 8) maneuvered transversally along a slide (9) in order to it a series of panels (10) that remain interlinked by a kind of flexible hinge (11) created by the scoring. Pushed along by the advancement of the sheet generated by the feed rollers (5, 6), this series of panels is folded in the manner of an accordion behind the production facility (1), where it is stacked to form a storage ream (12), which is placed onto a transport pallet (13).

Figure 2:
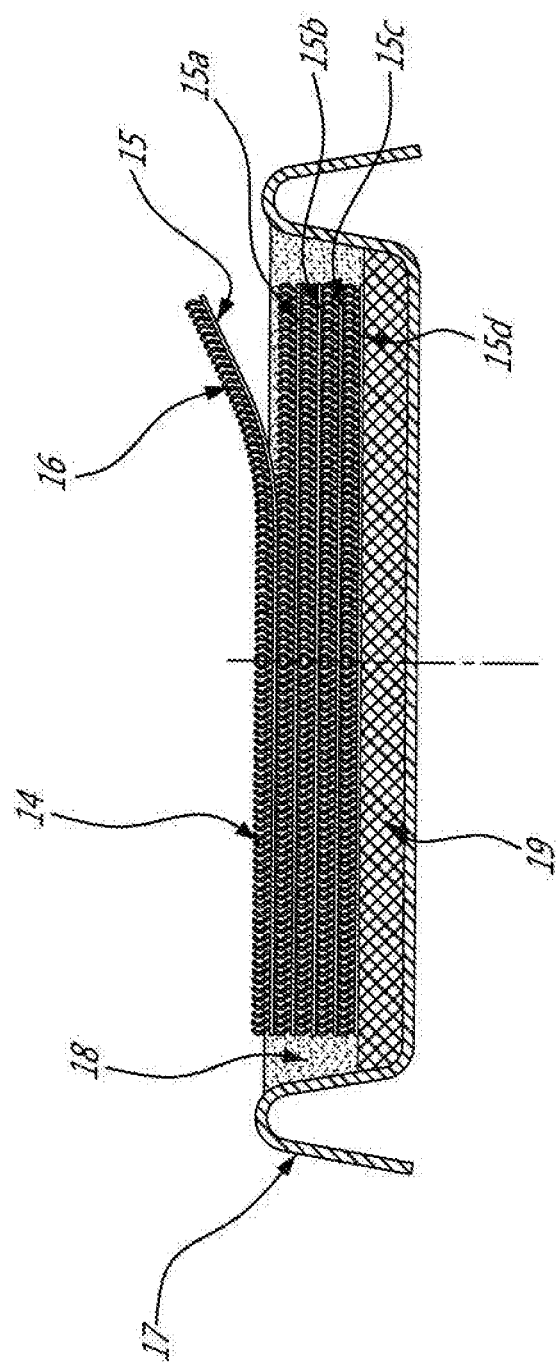
FIG. 2 is a schematic view in transverse section of an improvement of the container that enables a decontaminating mat to be implemented.

FIG. 2 shows, by way of non-limiting example, an improvement of the container that enables the implementation of a decontaminating mat in which the layering (14) comprises a series of membranes (15 to 15*d*) joined together by means of a plurality of mechanically engaging protuberances, which has been created here through the flocking of fibers (16). This layering is installed at the bottom of a trough-like framework (17). This framework, which is tight and substantially rigid, is filled with a liquid substance (18) that impregnates the fibers covering the membranes. Advantageously, the base of this framework is lined with a foam layer (19) to improve the flexibility of the mat.

The use of this container as a decontaminating mat will be readily understood. Since it is installed as the sole access to the entry to a space requiring protection, visitors are obligated to walk over it. As a simple doormat, it makes it possible to mechanically clean the soles of shoes, and store within it the impurities; what is more, however, the disinfectant and/or bacteriostatic products contained in the form of a liquid (18) in the framework (17) that impregnate the fibers (16) lining the membranes (15 to 15*d*) adhere to these soles, thus destroying undesirable microbes with which they may be covered. After a certain number of passes by visitors, the first membrane (15) of the layering (14) is considered to be soiled. It is peeled off, thus exposing the following membrane (15*a*), which is ready to use and whose active substances are also exposed to the ambient air. In this way, all of the membranes of the layering can be used successively down to the lowermost membrane (15*d*). The installation of a refill in the form of a new layering (14) of new membranes (15 to 15*d*) and the replenishment of the container constituted by the framework (17) with the liquid substance (18) containing the disinfectant and/or bacteriostatic products make it possible to prolong the use of the device a great number of times.

Figure 3:
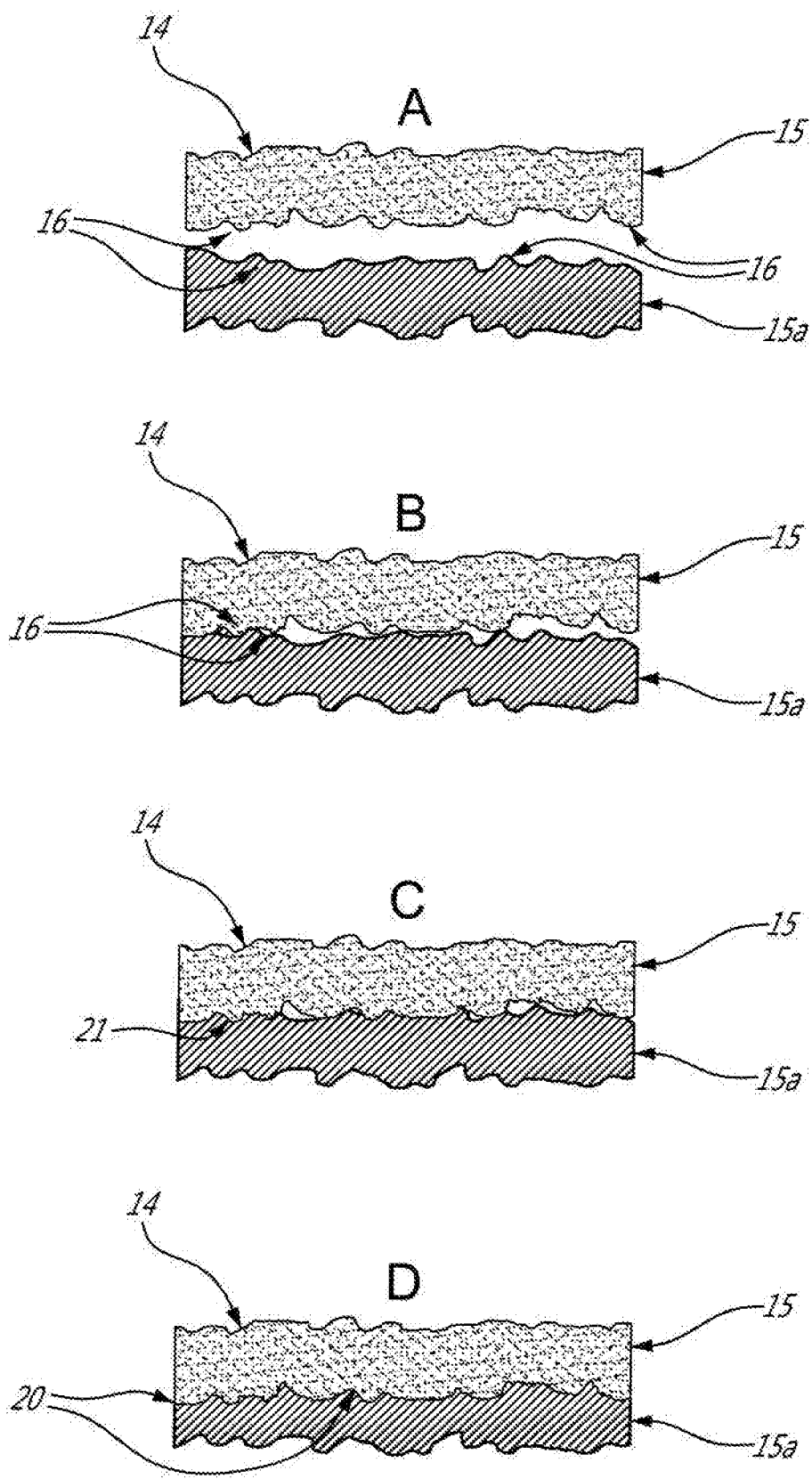
FIGS. 3A-D an enlarged schematic view illustrating, in four stages, the interpenetration of the protuberances that enables mutual engagement of the membranes of the layering.

FIG. 3 shows four sequences, marked A, B, C and D, of the process of the mutual engagement of the membranes (15 to 15*d*) to constitute the layering (14) with the aid of pressurized heating means. Sequence A shows partially greatly enlarged detail of the contact surfaces between two adjacent membranes (15 and 15*a*) as they appear before coming into contact. It can be seen that each of these two surfaces comprises a plurality of protuberances (16) that are facing one another. Sequence B illustrates the pressureless contacting of these very membranes (15 and 15*a*). Sequence C shows the action of the pressurization means that produces a certain interpenetration of the protuberances (16) of the two membranes (15 and 15a), with formation of pores (21) that remain interconnected nonetheless. Sequence D shows the result of the action of the heating means in combination with the pressurization means, which then produces, through plasticizing of the material, the progressive filling of the interconnected pores (21), thus eliminating all air bubbles and creating an interface (20) for engagement and continuous contact between the two membranes (15 and 15a).

The invention claimed is:

1. A container to collect and store messy products, comprising a framework covered by a stack of membranes wherein each membrane comprises means for being assembled through adherence by mutual contact to the mutual contact surfaces of an adjacent membrane or membranes, provided that an individual membrane may be peeled off said stack of membranes, further wherein said assembling means consists of a plurality of mechanically engaging protuberances located on the mutual contact surfaces of the membranes, further wherein said stack of membranes is comprised of two alternating types of membrane materials, each type of membrane materials being comprised of a single material different for each type of membrane materials and being incompatible for heat-welding to one another.

2. The container according to claim 1, wherein said protuberances result from the natural roughness of the surface texture of the membranes or the specific treatment of the mutual contact surfaces of the membranes through local deformation or through the removal or addition of membrane material.

3. The container according to claim 1, wherein the membranes are comprised of a material selected from the group consisting of polyethylene, polyethylene terephthalate, polyvinyl chloride, polypropylene, polystyrene and cardboard.

4. The container according to claim 3, wherein said protuberances are comprised of a powder of particles having an olfactory and/or disinfectant and/or bacteriostatic nature that is added to the material of the membranes.

5. The container according to claim 1, characterized in that the framework is comprised of a material selected from the group consisting of fibers that have been compressed and bound together with the aid of a binding agent, expanded plastic material and a composite material combining a plastic material with at least one natural microfiber from agriculture.

6. The container according claim 5, wherein said plurality of mechanically engaging protuberances is composed of fibers to which a fluid or powder having olfactory and/or disinfectant and/or bacteriostatic properties have been added or with which they have been impregnated.

7. The container according to claim 6, wherein said framework is composed of a rigid base that contains a lining made of flexible foam that is readily deformable.

8. A container according to claim 6, wherein said container is designed to be placed at an entrance of facilities that are sensitive to the intrusion of microbes as a result of the soiled soles of visitors' shoes, wherein said container engages the soiled soles of said visitors' shoes, removes decontaminants from the footwear of said visitors to said facilities, wherein after the visitor enters the facilities that are sensitive to the intrusion of microbes, the uppermost membrane of the stack of membranes is removed exposing the uncontaminated membrane under the membrane that is removed.

9. A method for manufacturing a container according to claim 1, comprising the step of mechanically engaging the protuberances located on the contact surface of an adjacent membrane or membranes comprising the stack of membranes covering the framework by applying a pressurized heating means to the contact surfaces of said protuberances to bring about the interpenetration of said protuberances.

10. The method according to claim 9, wherein said pressurized heating means causes said protuberances to gradually fill the networks of interconnected pores that are formed when one protuberance engages a second protuberance.

11. A container according to claim 1 wherein said stack of membranes is impregnated with a fluid or a powder having olfactory and/or disinfectant and/or bacteriostatic properties.

12. The container according to claim 11, wherein the protuberances are created through casting a of powder of particles of an olfactory and/or disinfectant and/or bacteriostatic nature onto the membranes rendered adherent through softening under heat.

13. The container according to claim 12, wherein the heating is preformed using a heating tunnel associated with at least one pair of counter-rotating pressure roller for carrying along the layering of membranes in the tunnel translationally.

* * * * *